United States Patent [19]

Mozer

[11] Patent Number: 5,603,670
[45] Date of Patent: Feb. 18, 1997

[54] MOVABLE DISK GUIDING ARRANGEMENT

[75] Inventor: Herbert Mozer, Friedrichshafen, Germany

[73] Assignee: ZF Friedrichshafen AG, Friedrichshafen, Germany

[21] Appl. No.: 492,127

[22] PCT Filed: Feb. 15, 1994

[86] PCT No.: PCT/EP94/00424

§ 371 Date: Aug. 10, 1995

§ 102(e) Date: Aug. 10, 1995

[87] PCT Pub. No.: WO94/19627

PCT Pub. Date: Sep. 1, 1994

[30] Foreign Application Priority Data

Feb. 19, 1993 [DE] Germany .................. 43 05 102.2

[51] Int. Cl.⁶ .................................................. F16H 55/56
[52] U.S. Cl. ................................... 474/43; 384/615
[58] Field of Search ................. 474/43–45; 384/609, 384/615, 613, 614

[56] References Cited

U.S. PATENT DOCUMENTS

| | | | |
|---|---|---|---|
| 4,487,595 | 12/1984 | Quick et al. | 474/15 |
| 4,919,643 | 4/1990 | Fuss et al. | 474/46 |
| 5,156,462 | 10/1992 | Jacob et al. | 384/49 |
| 5,482,382 | 1/1996 | Sato et al. | 384/609 X |

*Primary Examiner*—Roger J. Schoeppel
*Attorney, Agent, or Firm*—Davis and Bujold

[57] ABSTRACT

An arrangement is proposed for guiding a movable disk (3) in a continuously variable belt-drive transmission. The movable disk (3) is supported on balls (4) embedded in a mounting (5). The mountings (5) are interconnected in a narrow area. The axial travel of the arrangement is determined by bearing surfaces.

10 Claims, 4 Drawing Sheets

5,603,670

MOVABLE DISK GUIDING ARRANGEMENT

The invention concerns an arrangement for guiding a movable disk in a continuously variable belt-drive transmission according to the preamble of the first claim.

Continuous belt-drive transmissions have a conic disk pair respectively on the input and output shafts. Between said conic disk pairs extends a belt, chain or link conveyor which winds around the input and output shafts. Each pair of conic disks consists of a first conic disk firmly connected with a shaft and a second conic disk movable in the axial direction. The axial position of the second disk is changed by a hydraulic actuation device. The effective diameter of the wind-around means and thus the gear ratio are thereby changed.

DE 38 16 357 has disclosed a continuously variable belt-drive transmission of the conic disk type. A movable disk shown therein is supported on loose balls. Said balls are guided in ball races which are attached, in the axial direction, to the shaft and the shank of the movable disk. The shaft and the shank have several such ball races. Two securing elements form the left and right stops for the balls. The balls are freely movable therebetween in the axial direction. In this design, it is a disadvantage that the securing elements and the balls have to be individually mounted by an apparatus or by hand, which is complicated and time consuming.

The problem on which the invention is based, is to seek, in a compact construction, a solution that facilitates assembly of a shaft/disk connection capable of load bearing.

According to the invention, the problem is solved by embedding the balls in a mounting and coordinating the balls with a ball race. The mountings are mostly interconnected in a narrow area. Thereby, the advantage that all the balls are inserted in only one step is obtained. The solution according to the invention is obviously applicable to other rolling bodies. Said mountings and connections are usually made of sheet metal or plastic. Balls of the same tolerance are identified by a colored mark on the mounting.

In a development of the invention, it is proposed that the interconnection of the mountings be a securing ring. The securing ring is slotted for better assembly. The axial path of the securing ring is determined by sitting the securing ring in a shaft groove or by the securing ring abutting on two surfaces. The bearing surfaces can result, for example, by a recess of the shaft. Since the securing ring, the mounting and the balls form a unit, the axial path of the balls is also thus defined. Unlike the prior art, the second securing element is eliminated. The mounting/securing ring connection can be releasable, such as by denting, and also unreleasable, such as by the mounting and the securing ring being made of one plastic part.

In another embodiment of the invention, it is proposed that the securing ring has several supporting portions. The supporting portions are situated on the outer periphery of the securing ring. The axial path of the securing ring is now determined by a surface in the hub of the movable second disk and by a surface on the shaft on which the supporting portions abut. Thereby, the resistance moment of the shaft increases. A slight axial displaceability of the mounting and securing ring arrangement means shorter ball races. From this results the advantage that the hub of the movable disk can be designed shorter. From this results a lesser total length of installation for a conic disk pair.

An embodiment of the invention is shown in the drawings. In the drawings.

Figure 1:
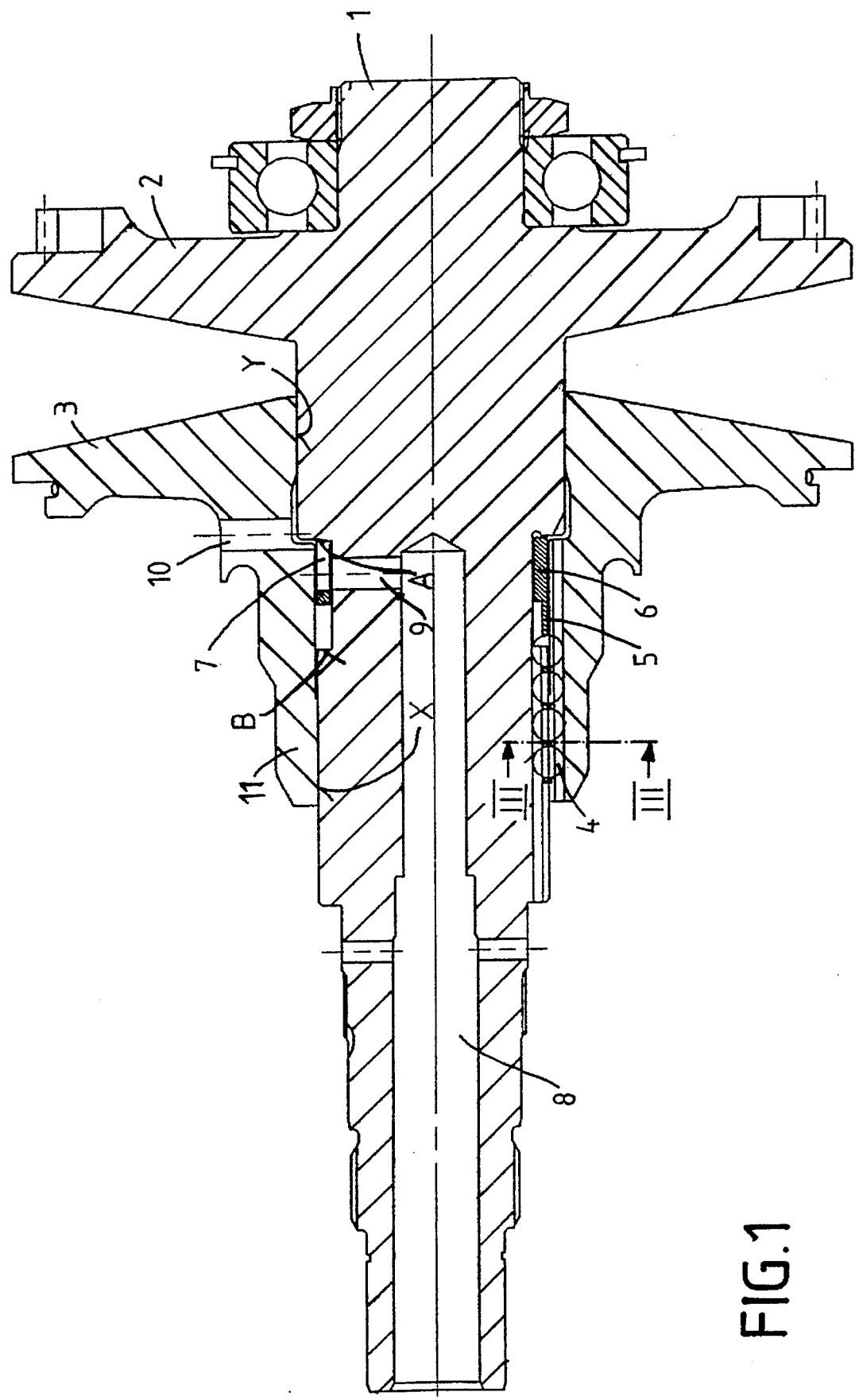
FIG. 1 shows a longitudinal section of a shaft with a conic disk pair.

FIG. 1 shows, in longitudinal section, a shaft 1 having a conic disk pair. The conic disk pair consists of a conic disk 2 that is stationary on the shaft 1 and a conic disk 3 that is movable in the axial direction on the shaft 1. Between both conic disks extends a wind-around means, not shown, such as a belt. As a result of the displacement of the movable disk 3 in the axial direction, the effective diameter of the wind-around means is changed. The disk 3 is supported on balls 4. The balls 4 accomplish two kinds of function:

1. the displaceability of the disk 3 in the axial direction; and
2. the torque transmission from the rotating disk 3 to the shaft 1 in an output shaft and from the rotating shaft 1 to the disk 3 in an input shaft.

The disk 3 is centered on the shaft 1 by the centering diameters X and Y. The magnitude of the maximum transmissible torque is established, as is known per se, by the number of balls 4. The balls 4 are embedded in a mounting 5. Several ball races with mountings 5 are distributed on the periphery of the shaft 1, only one being shown in FIG. 1, the mounting lying in the sectional plane. The mounting 5 consists of one horizontal and one perpendicular web. The mounting 5 is connected with a slotted securing ring 6. The connection of the mounting 5 with the securing ring 6 can be releasable, such as by denting, or unrealeasable, such as by casting the mounting 5 and the securing ring 6 from a single plastic part.

In FIG. 1 an unreleasable connection is shown. The axial path of the firm arrangement of the balls 4, mounting 5 and securing ring 6 is determined by bearing surfaces A and B. The second securing element is thereby omitted. Both bearing surfaces A and B result from a recess in the shaft 1. The axial distance of both surfaces A and B is determined by the maximum thrust of the movable disk 3. The securing ring 6 has several passages 7. A pressure medium is fed to a pressure chamber, not shown, via the duct 8, bore 9, passage 7 and bore 10. The position of the movable disk 3 is determined by the pressure level in said pressure chamber.

Figure 2:
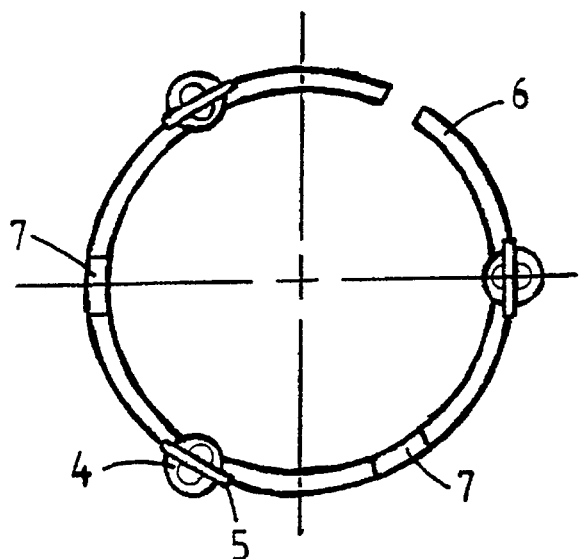
FIG. 2 shows an embodiment of the securing ring with a mounting.

FIG. 2 shows the slotted securing ring 6 of FIG. 1 in a top view. Several mountings 5, in which balls 4 are embedded, are placed on the securing ring 6. Three mountings 5 are shown. The mountings 5 consist of a horizontal and a perpendicular web. The securing ring 6 has several passages 7 for a pressure medium. Two passages 7 are shown.

Figure 3:
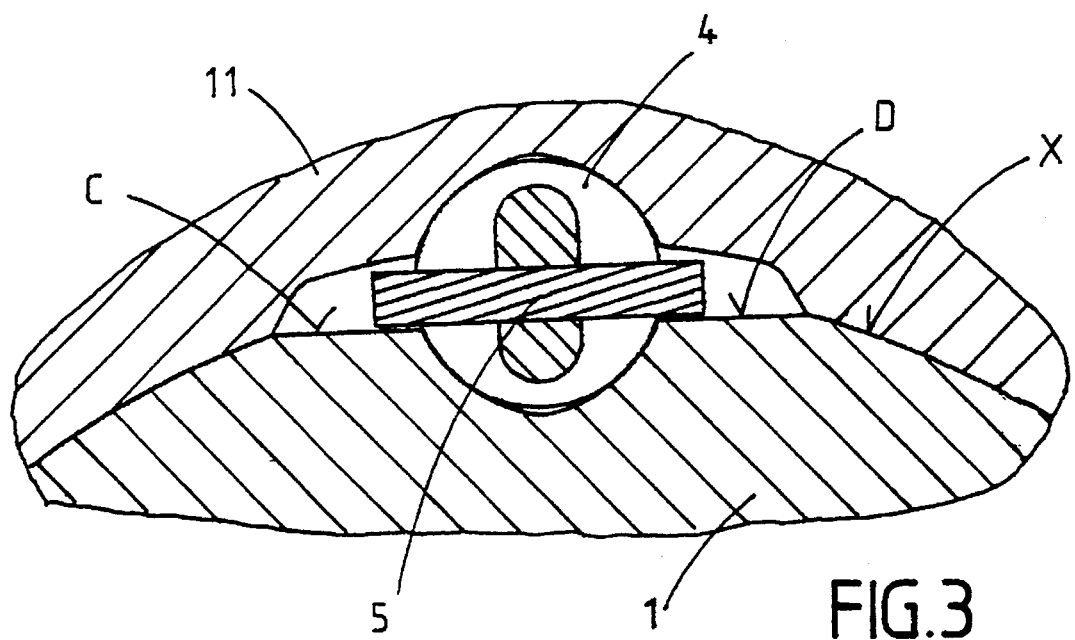
FIG. 3 shows a sectional view along line III—III.

FIG. 3 shows a section along line III—III of FIG. 1. The shaft 1 and the hub 11 of the movable disk 3 are shown. Ball races, in which run balls 4 held by a mounting 5, are inserted in the shaft 1 and hub 11. The mounting 5 consists of a horizontal and a perpendicular web. The torque is positively transmitted from the shaft 1 to the movable disk 3 via the balls 4. The number of balls 4 determines the magnitude of the transmissible torque. The shaft 1 is flattened in the area of the ball races, surfaces C and D. The flattening, and a corresponding configuration of the flank 11 in the area of the ball races, create an intermediate space for the mountings 5. This does not impair the guiding function of the centering diameter X.

Figure 4:
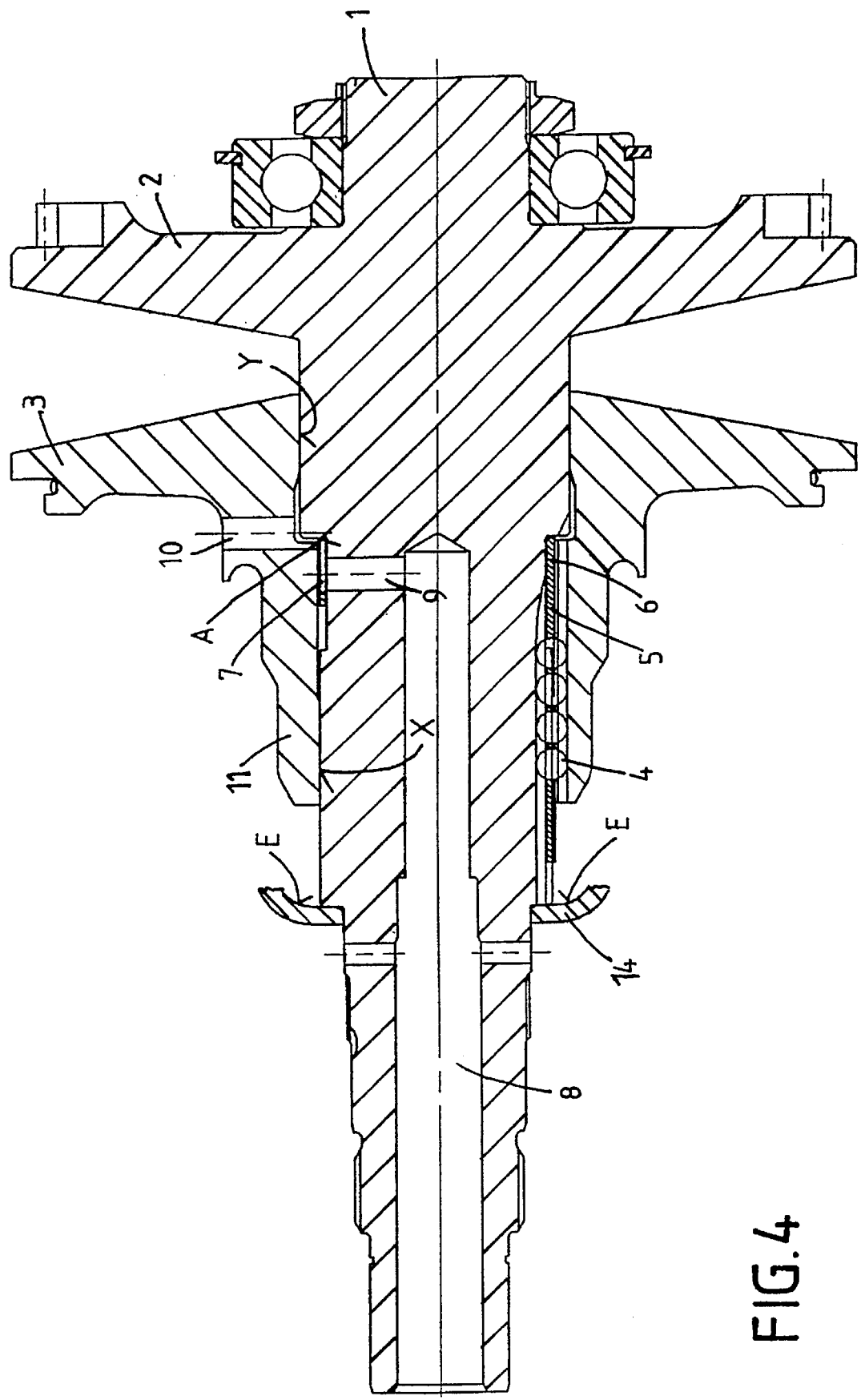
FIG. 4 shows a longitudinal section of a shaft with a conic disk pair.

FIG. 4 shows the same conic disk pair of FIG. 1 with a different design of the mounting 5 and securing ring 6. The axial path of the arrangement of balls 4, mounting 5 and securing ring 6 is determined by a bearing surface A and a bearing surface E. The bearing surface E can be, for instance, a stationary wall of the pot 14, as shown in FIG. 5.

Figure 5:
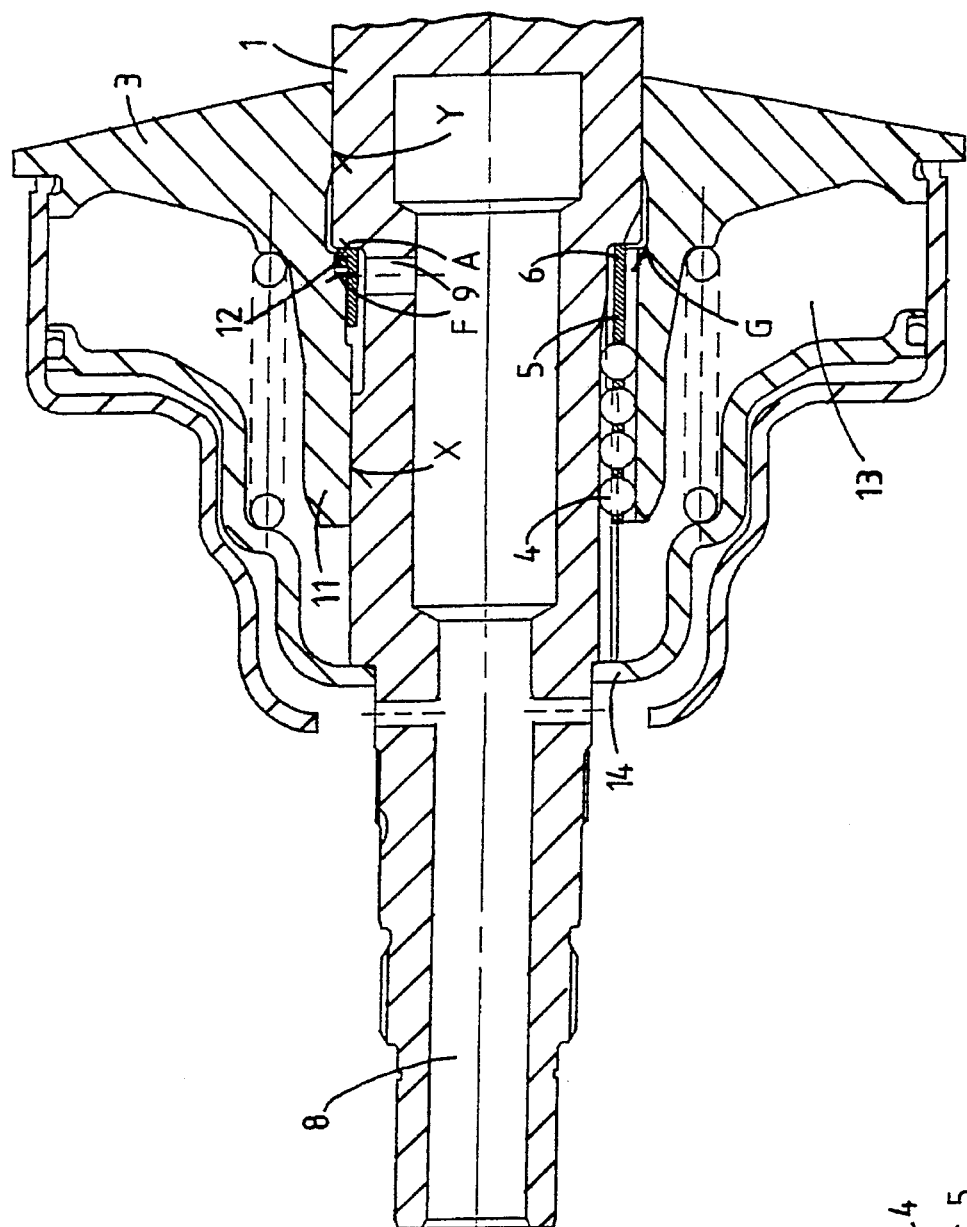
FIG. 5 shows a longitudinal section of a shaft with a conic disk pair.

FIG. 5 also shows the same conic disk pair of FIG. 1 with another design of the securing ring 6. The securing ring 6 has, in addition, several supporting portions 12. The axial path of the securing ring 6 and of the mountings 5 is determined by both bearing surfaces A and F on which the supporting portions 12 abut. The surface F results from radial recesses in the hub 11. The radial recesses are segmentally distributed on the periphery so that the remaining surface G maintains the function of axially limitating travel of the disk 3 with the surface A. Compared with FIG. 1, the shaft 1 has a larger diameter in the area of the recess and the bearing capacity is thereby improved. A pressure medium is fed to a pressure chamber 13 via the path constituted by duct 8, bore 9, passage 7 and bore 10. Said pressure chamber 13 is formed by the movable disk 3 and a pot 14. In FIG. 5, the passage 7 and the bore 10 are outside the plane of the drawing.

Figure 6:
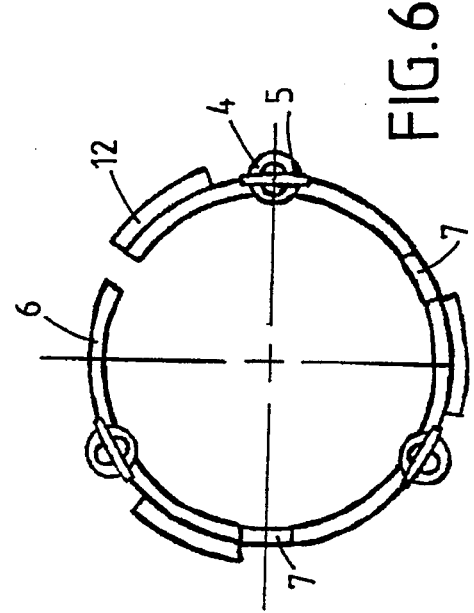
FIG. 6 shows an embodiment of a securing ring with mounting.

FIG. 6 shows the slotted securing ring 6 of FIG. 5 in a top view. On the securing ring 6 are placed several mountings 5 in which balls 4 are embedded. Three mountings are shown. The mountings 5 consist of a horizontal and a perpendicular web. The securing ring 6 has several passages 7 for a pressure medium. Two passages 7 are shown. The securing ring 6 additionally has several supporting portions 12 which are situated at equal distances on the periphery. Three supporting portions 12 are shown. The task of the supporting portions 12 is to establish, together with the bearing surfaces A and F, the axial travel of the mounting 5 and securing ring 6 arrangement.

| Reference numerals | | | |
|---|---|---|---|
| 1 | shaft | A | bearing surface |
| 2 | conic disk firm | B | bearing surface |
| 3 | conic disk, axially movable | C | flattening shaft |
| 4 | ball | D | flattening shaft |
| 5 | mounting | E | bearing surface |
| 6 | securing ring, slotted | F | bearing surface |
| 7 | passage | X | centering diameter |
| 8 | duct | Y | centering diameter |
| 9 | bore | | |
| 10 | bore | | |
| 11 | hub | | |
| 12 | supporting portion | | |
| 13 | pressure chamber | | |
| 14 | pot | | |

I claim:

1. An arrangement for guiding a movable disk (3) in a continuously variable belt-drive transmission having one pair of conic disks on input and output shafts, respectively, each pair of conic disks consisting of a first conic disk (2) stationary in an axial direction, and a second conic disk (3) which is movable in an axial direction on free balls guided on several ball races, wherein said balls (4) coordinated with the respective ball race are embedded in a mounting element (5), said mounting elements are designed so as not to impair the guiding function of said centering diameter (X) between disk (3) and shaft (1), and said mounting elements (5) are interconnected mostly in a narrow area by means of a connecting element.

2. An arrangement according to claim 1, wherein said connecting element is a securing ring (6).

3. An arrangement according to claim 2, wherein said securing ring (6) is slotted.

4. An arrangement according to claim 3, wherein said mounting elements (5) are releasably or unreleasably fixed with said connection or are also separate.

5. An arrangement according to claim 1, wherein said mounting elements (5) are one of releasably or unreleasably fixed with said connection or are also separate.

6. An arrangement according to claim 2, wherein said mounting elements (5) are releasably or unreleasably fixed with said connection or are also separate.

7. An arrangement according to claim 2, wherein one of a groove and two bearing surfaces of the structural parts determine the displaceability of said securing ring (6).

8. An arrangement according to claim 2, wherein said securing ring (6) has supporting portions (12) which abut against radial recesses of said disk (3) without disturbing the function of axial travel limitation of the surface (G) of said disk (3) on the surface (A) of said shaft (1).

9. An arrangement according to claim 2, wherein said securing ring (6) has passages (7) for a pressure medium.

10. An arrangement according to claim 1, wherein said input and output shafts are flattened in the area of said ball races and said movable disks have a particular outline in the area of said ball races.

* * * * *